(12) United States Patent
Wolter

(10) Patent No.: US 10,340,980 B1
(45) Date of Patent: Jul. 2, 2019

(54) TIME SYNCHRONIZATION APPARATUSES AND METHODS FOR POWER-DISTRIBUTION SYSTEMS AND THE LIKE

(71) Applicant: Landis+Gyr Technologies, LLC, Pequot Lakes, MN (US)

(72) Inventor: Chad K. Wolter, Breezy Point, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 0 days.

(21) Appl. No.: 15/972,818

(22) Filed: May 7, 2018

(51) Int. Cl.
*H04B 3/54* (2006.01)
*H04Q 9/00* (2006.01)

(52) U.S. Cl.
CPC .............. *H04B 3/54* (2013.01); *H04Q 9/00* (2013.01); *H04B 2203/5433* (2013.01); *H04Q 2209/25* (2013.01); *H04Q 2209/30* (2013.01); *H04Q 2209/60* (2013.01)

(58) Field of Classification Search
CPC .... H04B 3/54; H04B 2203/5433; H04Q 9/00; H04Q 2209/30; H04Q 2209/25
USPC ........ 375/257, 295, 316, 354, 356, 357, 359
See application file for complete search history.

(56) References Cited

U.S. PATENT DOCUMENTS

| | | |
|---|---|---|
| 5,467,011 A | 11/1995 | Hunt |
| 5,535,240 A | 7/1996 | Carney et al. |
| 5,581,229 A | 12/1996 | Hunt |
| 6,341,148 B1 | 1/2002 | Girardeau, Jr. |
| 6,965,502 B2 | 11/2005 | Duffey et al. |

(Continued)

FOREIGN PATENT DOCUMENTS

| | | |
|---|---|---|
| EP | 0638886 B1 | 2/1995 |
| EP | 2597911 A1 | 5/2013 |

OTHER PUBLICATIONS

Michael Zillgith et al. "Wireless IP Networks in Smart Grid Applications." The 1st IEEE International Symposium on Wireless Systems within the Conferences on Intelligent Data Acquisition and Advanced Computing Systems, Offenburg, Germany, pp. 79-84 (Sep. 20-21, 2012).

*Primary Examiner* — Siu M Lee
(74) *Attorney, Agent, or Firm* — Kilpatrick Townsend & Stockton LLP

(57) ABSTRACT

Aspects of the present disclosure are directed toward apparatuses and methods for time synchronizing between communication nodes of a communications network. In specific embodiments, the apparatus includes nodes having respective clocks circuit and communication circuitry for communicating with other nodes in the network, and the nodes convey or operate on power-related data indicative of power consumption within a power distribution system by communicating the power-related data between communication nodes of the network or system. Each node can provide a time synchronization request to another of the nodes within an interval after being permitted to join into the communications network, and which then results in the node setting the clock circuit to a parameter conveyed from the second node via timing information provided in a uniquely-recognizable data frame as communicated via one of the upper-level layers. The node maintains on-going time synchronization by communicating additional time synchronization requests within predetermined time ranges.

24 Claims, 4 Drawing Sheets

(56) References Cited

U.S. PATENT DOCUMENTS

| | | | |
|---|---|---|---|
| 6,998,963 | B2 | 2/2006 | Flen et al. |
| 7,102,490 | B2 | 9/2006 | Flen et al. |
| 7,145,438 | B2 | 12/2006 | Flen et al. |
| 7,180,412 | B2 | 2/2007 | Bonicatto et al. |
| 7,224,740 | B2 | 5/2007 | Hunt |
| 7,236,765 | B2 | 6/2007 | Bonicatto et al. |
| 7,432,824 | B2 | 10/2008 | Flen et al. |
| 7,706,320 | B2 * | 4/2010 | Davis .................. H04W 40/20 370/325 |
| 7,742,393 | B2 | 6/2010 | Bonicatto et al. |
| 7,791,468 | B2 | 9/2010 | Bonicatto et al. |
| 8,238,263 | B2 | 8/2012 | Kohout et al. |
| 8,325,728 | B2 | 12/2012 | Zeppetelle et al. |
| 8,428,201 | B1 | 4/2013 | McHann, Jr. et al. |
| 8,619,846 | B2 | 12/2013 | Johnson et al. |
| 8,675,779 | B2 | 3/2014 | Zeppetelle et al. |
| 8,681,619 | B2 | 3/2014 | Bonicatto et al. |
| 8,693,580 | B2 | 4/2014 | McHann, Jr. |
| 8,693,605 | B2 | 4/2014 | Wolter et al. |
| 8,711,995 | B2 | 4/2014 | Glende |
| 8,731,076 | B2 | 5/2014 | Bonicatto et al. |
| 8,737,555 | B2 | 5/2014 | Haug et al. |
| 8,750,395 | B1 | 6/2014 | Woodruff et al. |
| 8,762,820 | B1 | 6/2014 | Bonicatto et al. |
| 8,811,529 | B1 | 8/2014 | Pelletier et al. |
| 8,842,563 | B1 | 9/2014 | Duff et al. |
| 8,848,521 | B1 | 9/2014 | Duff |
| 8,875,003 | B1 | 10/2014 | Wolter et al. |
| 8,958,487 | B2 | 2/2015 | Morris et al. |
| 8,989,693 | B1 | 3/2015 | Duff et al. |
| 9,019,121 | B1 | 4/2015 | Duff et al. |
| 9,037,305 | B2 | 5/2015 | McHann, Jr. et al. |
| 9,081,684 | B2 | 7/2015 | Haug et al. |
| 9,106,317 | B1 | 8/2015 | Johnson et al. |
| 9,106,365 | B1 | 8/2015 | Bonicatto et al. |
| 9,148,320 | B1 | 9/2015 | Pelletier |
| 9,306,624 | B1 | 4/2016 | Wolter et al. |
| 9,369,180 | B1 | 6/2016 | Bonicatto |
| 9,461,707 | B1 | 10/2016 | Virden et al. |
| 9,525,462 | B1 | 12/2016 | Haug et al. |
| 9,647,495 | B2 | 5/2017 | Bonicatto |
| 9,667,315 | B2 | 5/2017 | Bonicatto et al. |
| 9,729,200 | B2 | 8/2017 | Virden et al. |
| 9,853,883 | B2 | 12/2017 | Thubert et al. |
| 2003/0053553 | A1 | 3/2003 | Critchlow et al. |
| 2003/0133473 | A1 | 7/2003 | Manis et al. |
| 2005/0017847 | A1 | 1/2005 | Bonicatto et al. |
| 2005/0169415 | A1 | 8/2005 | Nayak et al. |
| 2006/0067282 | A1 * | 3/2006 | Sherman ............. H04L 12/2854 370/338 |
| 2008/0146166 | A1 | 6/2008 | Khan et al. |
| 2009/0312636 | A1 | 12/2009 | Kunita |
| 2012/0084559 | A1 | 4/2012 | Bonicatto |
| 2012/0163177 | A1 * | 6/2012 | Vaswani ................ H04L 45/00 370/236 |
| 2013/0034137 | A1 | 2/2013 | Zuckerman |
| 2013/0163683 | A1 | 6/2013 | Morris et al. |
| 2013/0283360 | A1 * | 10/2013 | Hui ....................... H04L 9/0866 726/6 |
| 2014/0064387 | A1 | 3/2014 | Bonicatto et al. |
| 2014/0126720 | A1 | 5/2014 | Bonicatto |
| 2014/0247892 | A1 | 9/2014 | Williams et al. |
| 2015/0067431 | A1 | 3/2015 | Haug et al. |
| 2015/0341874 | A1 * | 11/2015 | Nguyen-Dang ............................ H04W 52/0209 370/350 |
| 2017/0163310 | A1 | 6/2017 | Haug et al. |

\* cited by examiner

TIME SYNCHRONIZATION APPARATUSES AND METHODS FOR POWER-DISTRIBUTION SYSTEMS AND THE LIKE

BACKGROUND

Communications networks can be used to provide a variety of data between nodes forming part of the network. Some communications networks can provide peer-to-peer communication for distributing data across the network, such as for utility services. As a specific example, power utility companies that use power distribution lines to carry power to customers spanning large geographic areas, typically from one or more power generating stations (or power plants) to residential and commercial customer sites, can use a mesh network to communicate various data. The power is carried on power distribution lines from the power plants at relatively high voltages and using alternating current (AC). Substations are commonly located near the customer sites to provide a step-down of the high voltage to a lower voltage (e.g., using transformers). Power distribution lines carry this lower-voltage AC from the substations to multitudes of customer sites at which endpoint (e.g., power-consumption metering) devices are installed to monitor and report on the power consumed at each site.

Power distribution systems can take on various different forms, oftentimes differentiated based on how the power distribution lines and the endpoint devices are used by the power-providing and other types of utility companies. A power distribution system sometimes includes power-line communication (PLC) in the system with each of the multitudes of the endpoint devices being configured to provide reports on the power consumed at each site by the endpoint devices transmitting this data back to the utility companies over the power lines. Such endpoint devices commonly replace the less-sophisticated approach of a meter reader being walked to each customer site and used to manually read individual endpoint devices in order to track the power consumed.

Some of the more-sophisticated types of power distribution systems implement communications between customer sites through the use of a mesh network in which nodes communicate data via data layers. This approach extends the communication reach of the communications networks so as to reach facilities remotely located in the outermost layers of the network, and such systems can be implemented in a distributed manner so that there is no single point of failure.

SUMMARY

Aspects of the present disclosure are directed to addressing the above-discussed issues as well as others which will become apparent based on the detailed description that follows. According to one embodiment of the present disclosure, aspects are directed to time synchronization between various circuit-based communication nodes of a mesh-based communications network using methods and apparatuses (e.g., systems and devices) which may be installed at customer sites and in some instances, used in a portable manner (e.g., for testing and temporary servicing).

Aspects of the present invention include a time synchronization protocol for a mesh-based communications network that has been found to be beneficial as used in a power distribution system. The power distribution system distributes electrical power to devices at different remotely-located sites and can include communication of power-related data between communication nodes. The power-related data is indicative of or otherwise associated with power consumption, such as consumption by the devices at the remotely located sites. Specific embodiments are directed to an apparatus that includes a plurality of communicative nodes (e.g., each including data-communication circuitry and at least some data-processing circuitry for communicating with other similarly-configured circuitry of other nodes). As exemplified in the power distribution system, the nodes can operate on the power-related data such as by communicating metered data, changes in load, faults, reconfiguration information and the like. The nodes can include communication circuitry for wireless and/or wired communication of such power-related data between the communication nodes. When implemented as part of a mesh-based communications network, one specific embodiment has each node configured with a clock and with processing between nodes via a plurality of data-communication abstraction layers, such as layers of an Internet Protocol (IP) stack. It will appreciated that a clock circuit (or "clock") in this context can be implemented in various forms (e.g., as a programmable logic circuit or software-implemented function in a computer circuit). The layers include a lower-level layer used for node-node interaction involving identification of respective ones of a plurality of other communication nodes and upper-level layers. For example, one node can provide a time synchronization request to another node within an interval, such as an arbitrarily-set timing interval (e.g., pseudo-random, aka "random") interval, after being permitted to join into the mesh-based communications network and sets the clock to a parameter conveyed from the other node via timing information. Where the nodes would expect the lowest-level layer to share timing/synchronization information, specific timing/synchronization information is provided in a uniquely-recognizable data frame as communicated via one of the upper-level layers. In specific embodiments, each node can maintain on-going time synchronization by communicating additional time synchronization requests within predetermined time ranges.

In specific embodiments, circuits in communication nodes can communicate using the plurality of abstraction layers, such as an IP stack having a lower-level (or lowest-level) layer used for conventional node-node interaction (e.g., for sharing identification of each node/device) as well as upper-level layers as might be used for sharing network-service provisions, transmit-protocol information, and packet-construct data (using TCP/IP model as an example). The time synchronization occurs between nodes via requests and timing information communicated over one of the upper-level layers, and without pushing the data to other upper-level layers. In response to a particular node joining the communications network, the node requests time synchronization with a parent node and the parent node provides timing information, which is used to set a clock of the requesting node. The respective nodes communicate while being time synchronized and maintain on-going time synchronization with each other by updating the time value subsequently within predetermined time ranges. These and other aspects of the present disclosure are exemplified in a number of illustrated implementations and applications, some of which are shown in the figures and characterized in the claims section that follows.

In accordance with various embodiments, a communications network provides peer-to-peer communication for distributing data across the network, such as for utility services. The communications network can be a mesh network in which network nodes connect directly, dynamically, and non-hierarchically to other network nodes. The network nodes cooperate with one another to efficiently route data within the communications network. A mesh network can dynamically self-organize and self-configure, which can reduce installation overhead and enable dynamic distributes of workloads. As a specific example, a mesh network can be used in a power distribution system, which can include power-line communication (PLC), were each of the multitudes of the endpoint devices provide reports on power consumed at each site by the endpoint devices transmitting this data back to the utility companies. The endpoint devices can include communication nodes used to communicate the data back and/or otherwise communicate to the utility company in the event of an issue with the endpoint device (such as lost connection to the power line and/or other faults). In accordance with various embodiments, it may be advantageous to have time synchronization between nodes of the communications network. As a particular example, the mesh network may be used as part of a power-outage management system used to assess the efficacy of power delivered from a power utility company over power lines to a plurality of customer sites. The time synchronization can assist in the assessment and/or be used to identify faults in the system. Although embodiments are not limited to power distribution systems and can include a variety of peer-to-peer networks using other types of transportation technology.

In accordance with one particular embodiment, an apparatus includes node having a clock. The apparatus can be used in a power distribution network having power-related data shared between communication nodes. The node can communicate in a mesh-based communications network using a plurality of abstraction layers including a lower-level layer used for node-node interaction involving identification of respective ones of a plurality of other communication nodes. The node can time synchronize with another node in the nodal communications network. For example, one node can provide a time synchronization request to other node within a random interval after being permitted to join into the mesh-based communications network and set the clock to a parameter conveyed from the other node via timing information. The timing information is provided in a uniquely-recognizable data frame as communicated via one of the upper-level layers. Additionally, the node maintains on-going time synchronization by communicating additional time synchronization requests within predetermined time ranges.

In other more specific embodiments, an apparatus includes mesh network-communications controller circuitry, a first node and a second node that are used to provide data paths for communicating data in a (mesh-based) communications network via a beacon-based communication protocol over which data between circuits in a grouping (or network of) communication nodes, including a first node and a second node, communicate using a plurality of abstraction layers. The plurality of abstraction layers include a lower-level layer used for node-node interaction involving identification of respective ones of the communication nodes and including upper-level layers. The first node (e.g., a child node) includes a clock. The first node sends a time synchronization request, within a random interval after the first node is permitted by the mesh network-communications controller circuitry to join into the communications network, and sets the clock to a parameter conveyed from the second node. The second node (e.g., parent node) provides timing information used by the first node for setting the parameter, via a time value in a uniquely-recognizable data frame and via one of the upper-level layers (e.g., medium access control (MAC) layer), in response to receiving the time synchronization request. Further, the first node and second node communicate data while being time synchronized with each other in the communications network and maintain on-going time synchronization with each other by updating the time value subsequently within predetermined time ranges.

A number of embodiments are direct to methods for performing time synchronization, such as for use in a power distribution system having power-related data shared between communication nodes. An example method includes providing data paths for communicating data in a communications network via a communication protocol over which data between circuits in communication nodes, including a first node and a second node, communicate using a plurality of abstraction layers including a lower-level layer used for node-node interaction involving identification of respective ones of the communication nodes and including upper-level layers. The method further includes providing, by the first node, a time synchronization request, within a random interval after the first node is permitted to join into the communications network, and providing timing information to the first node as a time value in a uniquely-recognizable data frame via one of the upper-level layers (e.g., MAC layer) in response to receiving the time synchronization request. The clock of the first node is set to a parameter conveyed from the second node in the timing information. The method further includes, maintaining, by the first node and second node, on-going time synchronization with each other by updating the time value subsequently within predetermined time ranges. In various specific embodiments, the random time interval and/or predetermined time ranges can be set and/or adjusted.

The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description in connection with the accompanying drawings, in which.

Figure 1:
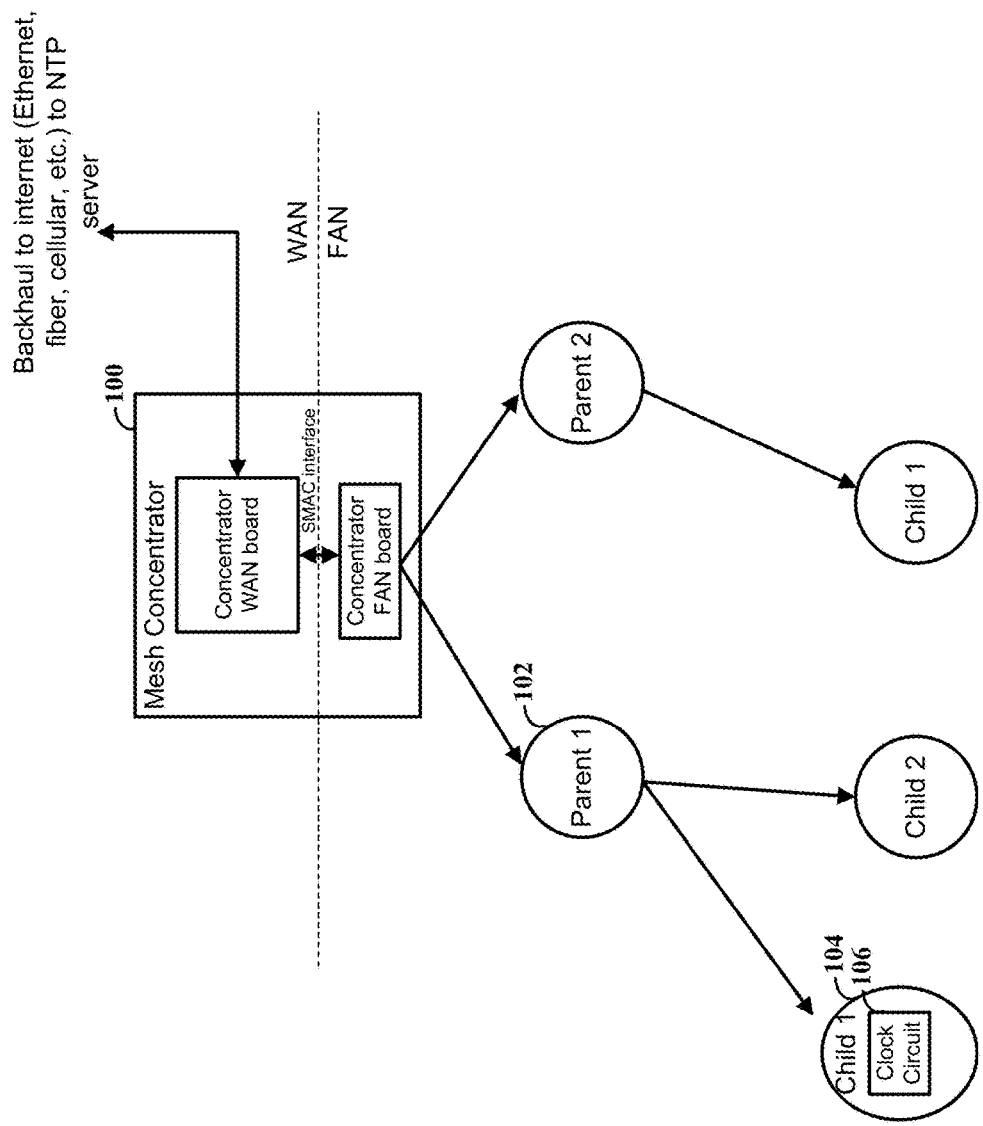
FIG. 1 is a block diagram of an example apparatus for time synchronizing between communication nodes, consistent with embodiments of the present disclosure.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Aspects of the present disclosure are believed to be applicable to a variety of different types of devices, systems and arrangements, including those that may be implemented for communicating time synchronized data over a mesh-based communications network in a power distribution system such as involving distribution of power over power lines to houses and other facilities (e.g., via power substations) where consumed power is metered and reported back to the power company. While the present disclosure is not necessarily limited to such applications, various aspects of the disclosure may be appreciated through a discussion of various examples using these contexts.

In accordance with various embodiments, a communications network provides peer-to-peer communication used to distribute data across the network, such as in a mesh-based communications network for power-distribution utility services. The communications network can be a mesh network in which communication nodes (e.g., circuitries) connect directly, dynamically, and non-hierarchically to other network nodes. In a full mesh network, each node is connected to each other node communicatively-connected within the network. In a partial mesh network, less than all network nodes are connected to every node. The communication nodes cooperate with one another to efficiently route data within the communications network. A mesh network can dynamically self-organize and self-configure, which reduce installation overhead and enable dynamic distributes of workloads. For example, if one or more communication nodes fail, the mesh network can reconfigured and/or redistribute the workloads, which can contribute to fault-tolerance and reduced maintenance cost.

As a specific example, a mesh network can be used in a power distribution system, which can include power-line communication (PLC), where each of a multitudes of end-point devices (e.g., communication nodes) provide reports on the power consumed at each site by the endpoint devices transmitting this data back to the utility companies. The endpoint devices can include communication nodes having a communication circuit used to communicate the power-related data back and/or otherwise communicate to the utility company in the event of an issue with the endpoint device (such as lost connection to the power line and/or other faults). Alternatively and/or in addition, the communication nodes can be separate from the endpoint devices and can communicate with the endpoint devices in a wireless or wired manner. In accordance with various embodiments, it may be advantageous to have time synchronization between nodes of the communications network. As a particular example, the mesh network may be used as part of a power-outage management system used to assess the efficacy of power delivered from a power utility company over power lines to a plurality of customer sites. The time synchronization can assist in the assessment and/or be used to identify faults in the system. Other embodiments are not limited to power distribution systems and/or mesh networks, and they can include a variety of peer-to-peer networks using other types of transportation technology.

Consistent with more specific embodiments, network-enabled communication devices are located at respective homes, buildings and other facilities (i.e., customer-site facilities) at which electrical power is distributed by energy carried by power lines which are connected to the facility of a customer site. The network-enabled communication devices (or simply "communication devices") can be configured to communicate using different communication schemes and, optionally and applicable to power distribution systems, can be configured by sending configuration data to the communication devices over shared power lines. Some, if not all, of the network-enabled communication devices may be wireless-enabled devices, herein referred to or including a "communication node" in which the communication devices communicate over the broadband network wirelessly such as by a WiFi or a cellular telephony protocol, while still being electrically powered via the power lines attached to the facility and operated by the utility company. Although embodiments are not so limited and the communication can be wired communications. Such broadband-enabled communication devices may include thermostats, water heaters, water softeners, washing machines, clothes dryers, dish washers, air conditioners and HVAC equipment generally, fixed (facility-installed) cameras, door locks, remotely-controlled sprinkler systems (such as sold under the tradename Rainbird), and remotely-controlled electrical components (e.g., light switches and outlets such as sold under the tradename WEMO by Belken (www.belkin.com/us/Products/home-automation/c/wemo-home-automation/).

In connection with the present disclosure, it has been discovered that broadband-enabled communication devices (e.g., Wi-Fi enabled thermostat or "smart thermostat") which are powered by energy from a utility company's power lines can be used not only as intended (e.g., for monitoring/controlling a facility's temperature), but can also be used with protocol-specific communications to serve in a variety of roles, such as implementing a time synchronization protocol. Because these communication nodes are communicatively coupled to one or more broadband networks such as the Internet and cellular telephone networks, they provide users and third-party service providers access to the status and output data generated by the devices which, in the case of the example smart thermostat, is to monitor, report and/or adjustment of the temperature within the facility.

Various embodiments in accordance with the present disclosure can include providing time synchronization within a communications network with low latency and overhead by communicating time synchronization requests and timing information using one of the upper layers of a plurality of abstraction layers. Data paths can be provided for communicating data in the communications network via a communication protocol, such as via a beacon-based communication protocol. Using the communication protocol, data between circuits in communication nodes is communicated using a plurality of abstraction layers. The plurality of abstraction layers include a lower-level layer used for node-node interaction and upper-level layers. Embodiments in accordance with the present disclosure can allow for time synchronization between respective communication nodes using one of the upper-level layers and without pushing the data through one or more of the remaining upper-level layers. In specific embodiments, the data is communicated on the data-link layer, such as the medium access control (MAC) layer.

The time synchronization requests can include a data frame having a unique identifier (e.g., multiple bits or a byte) that signifies, to the second node, that the request includes a time request. The second node receives the time synchronization request and provides timing information to be used by the first node for setting a clock. The timing information is provided as a uniquely-recognizable data frame that can include a time value as a special parameter to set the clock.

For example, the first node receives the uniquely-recognizable data frame and identifies the data frame based on a unique ID set of bits or byte which signifies that the frame includes a time value. As one non-limiting example, the time value can include a four-byte epoc time value. The first node identifies or recognizes the frame which includes a time value based on the unique ID byte and sets the clock to a parameter indicated by the time value. The respective nodes then communicate while being time synchronized.

In accordance with a number of embodiments, the first and second nodes can maintain on-going time synchronization with each other by subsequently updating the time value within one or more predetermined time ranges. As an example, the first node can periodically send additional time synchronization requests. In some specific embodiments, the random interval can include a time within a first time interval (e.g., 0-120 seconds) and the additional requests can be sent at periodic times that are each greater than the first time interval. As a specific example, the first time interval can be selected from a value between 0 and 120 seconds and the periodic times can be 900 seconds, or any value greater than 120 seconds. Other embodiments are not so limited, and a variety of time values can be used including periodic times that are equal to or less than the first time interval.

As background, it will be appreciated that such a network includes a network of terminals such as communication circuits/servers and base stations, sometimes referred to as "nodes," as exemplified in an implementation using a wireless local area network (WLAN) for communications between nodes. In a mesh network, the nodes can act as a repeater to transfer data originating from another node to still another node. In a mesh network, long distances can be traversed, in particular on uneven or difficult terrain by the connectivity provided by each such set of nearby nodes. If a node fails, e.g., due to a hardware defect, its neighboring nodes seek out a different data transfer route. Mesh networks can include fixed or mobile devices.

Turning now to the figures, FIG. 1 is a block diagram of an example apparatus for time synchronizing between communication nodes, consistent with embodiments of the present disclosure. Various embodiments are directed to a time synchronization protocol for use in a power distribution system having power-related data shared between communication nodes.

The communication nodes can communicate in a mesh-based communications network in which the communication nodes communicate data, such as the power-related data, using a plurality of abstraction layers. The layers can include a lower-level layer used for node-node interaction involving identification of respective ones of the plurality of other network nodes and upper-level layers. As would be appreciated by one of ordinary skill, example abstraction layers includes an Internet Protocol (IP) stack such as the Open Systems Interconnection (OSI) layers. For more general information on the OSI layers and specific information on each layer of the stack, reference is made to European Patent EP0638886B1, entitled "Method for transmitting a message between two subscriber stations and device for performing the method", filed Jun. 29, 1994, which is fully incorporated herein in its entirety for its teaching. OSI defines the process of communication between communication nodes in the communications network, where each of the communication nodes provides each of the layers of function. As an example, the lower-level layer can include the physical layer. As would be appreciated, with communication between nodes, data generally flows down through the layers in the source network node and up through the layers in the receiving communication node. The time synchronization protocol can be implemented by communicating time synchronization requests and timing information between respective nodes using one of the upper-level layers, and in some instances, without pushing the data through the other upper-level layers.

Various embodiments implement the time synchronization in addition to a child-parent link formed using a routing over low power and lossy network (RPL) routing protocol. As a specific example, the mesh network may be implemented using a specification, such as the 802.15.4-2006 specification. A first node, which can be referred to as a "child node," joins a second node, which can be referred to as a "parent node." As used herein, joining includes or refers to forming a link and can be part of a RPL Destination Oriented Directed Acyclic Graph (DODAG). In specific embodiments, a child node joins a parent node after sending a beacon request, receiving beacon responses, and Protocol for Carrying Authentication for Network Access (PANA) authentication. In response to joining the second node, the first node sends a time synchronization request to the second node via the one upper-level layer. The time synchronization request can be sent within a random interval. In a specific embodiment, the random interval includes a value between 0-120 after joining. As further described herein, in some specific embodiments, the random interval can be adjusted and/or otherwise set.

For example, the apparatus can include a first node 104, which is illustrated as a "child node," and includes a clock (circuit) 106 corresponding to and/or indicated by the previously-discussed clock circuit/function. The first node 104 can be a child node to the second node 102, illustrated as a "parent node" by forming a link with the second node 102 and/or otherwise joining into the communications network. In some specific embodiments, mesh network-communications controller circuitry 100 can permit the first node 104 to join into the communications network and/or otherwise form the link with the second node 102. In a specific implementation, the first node 104 forms the link with the second node 102 after a 802.15.4-2006 beacon request, beacon responses, and PANA authentications, and is joined and part of a RPL DODAG (e.g., the link is formed by the first node 104 providing a beacon request to the second node 102 and receiving a beacon response from the second node 102 via the data-link layer or other upper-level layer). Other embodiments are not necessarily limited to beacon request/response pairs, and links can be formed in the mesh network using a variety of techniques.

As previously described, in specific embodiments, the first node 104 and/or the second node 102 can be communication nodes in a power distribution system. The communication nodes can operate on power-related data that is indicative of power consumption within the power distribution system. For example, as further illustrated herein, the power-related data can be indicative of power consumption of endpoint devices in the power distribution system. The first node 104 and/or second node 102 can include a circuit (not shown) to wirelessly, or in a wired manner, communicate the power-related data, among other data, between communication nodes.

The following is a specific example of a time synchronization protocol in accordance with various embodiments. The first node 104, within an interval, such as an arbitrarily-set or random interval, after being permitted to join the communications network and/or forming the link with the second node 102, provides a time synchronization request to the second node 102. The random interval can be randomize for each request within the network within a first time interval (or span). A non-limiting example time interval includes 0-120 seconds, and in each implementation, the time synchronization request is provided randomly within 0-120 seconds. In other embodiments, the random interval is not randomized and is within the first time interval (or span). The time synchronization request can include a unique identifier (ID), such as a unique ID byte. The unique ID signifies, to the second node 102, that the data frame includes a time synchronization request. The timing request is communicated to the second node 102 via the one upper-level layer.

In response to the request, timing information is provided to the first node 104, as further described herein. The first node 104 receives the timing information as provided in a uniquely-recognizable data frame and as communicated via the one upper-level layer. The first node 104 sets the clock 106 to a parameter conveyed via the timing information. The first node 104 can additionally maintain on-going time synchronization by communicating additional time synchronization requests within predetermined time ranges. Additionally, the first node 104 and second node 102 can communicate data while being time synchronized with each other in the communications network.

In a number of embodiments, the apparatus additionally includes the mesh network-communications controller circuitry 100 and/or the second node 102. The mesh network-communications controller circuitry 100, which is sometimes referred to as a "mesh concentrator" can be used to provide communication between network circuits of the field area network (FAN) to the internet (e.g., wide area network (WAN)), such as via a Network Time Protocol (NTP) server. The mesh network-communications controller circuitry 100, as previously described, can also be used for joining nodes to the communications network. The mesh network-communications controller circuitry 100, the first node 104 and second node 102 provide data paths for communicating data in the communications network via a communication protocol over which data between circuits in communication nodes, including the first node and the second node, communicate using the plurality of abstraction layers. In some specific embodiments, the communication protocol includes a beacon-based communication protocol.

The second node 102 provides timing information used by the first node 104 for setting the parameter. For example, the second node 102 provides timing information via a timing value sent in a uniquely-recognizable data frame to the first node 104 that is communicated via the one upper-level frame. The uniquely-recognizable data frame can include a unique identifier (such as a unique ID byte) and a time value. The unique identifier can signify or indicate (to the first node 104) that the data frame includes a time value. In some embodiments, the time value includes a date (e.g., calendar date), time, and/or a combination thereof. The first node 104 sets the clock 106 to the parameter conveyed from the second node 102, and without pushing the time value throughout other upper-level layers. As previously described, the abstraction layers can be layers of an Internet Protocol (IP) stack, such as OSI layers.

In some specific embodiments, the one upper-level layer used for the time synchronization protocol is a data-link layer, such as a MAC layer. The first node 104 can provide the time synchronization request via the one upper-level layer, receive the timing information via the one (e.g., the same) upper-level layer, and set the clock corresponding to the parameter without pushing the time value throughout other upper-level layers of the IP stack, which can reduce latency as compared to pushing the data through the IP stack.

The first node 104 and second node 102 can communicate data, such as power-related data, while being time synchronized. As previously described, the time synchronization can be maintained by updating the time value subsequently within predetermined time ranges. The random time interval can be a first time interval, such as a range (e.g., 0-120 seconds). The predetermined time ranges can include one or more values, which may be greater than the first time interval. As specific non-limiting examples, the random time interval is between 0-120 seconds and the predetermined time ranges used to periodically send additional requests can be 900 seconds (and the predetermined time ranges may be equal to or less than the random time interval).

In various embodiments, the random time interval and/or predetermined time ranges can be set and/or adjusted by one or more of the first node 104, the second node 102, and/or the mesh network-communications controller circuitry 100. For example, circuitry can set the values to be within one or more ranges, and can later adjust the values within the range and/or adjust the range itself.

In a number of specific embodiments, the first node 104 and second node 102 communicate the time value and set the parameter for time synchronization as part of a time synchronization protocol, as described above. The first node 104 can further receive timing information, from another other network node, for providing time synchronization with the other communication node, via the time synchronization protocol. The time synchronization protocol can thereby be used to time synchronize a plurality of communication nodes in the communications network.

Figure 2:
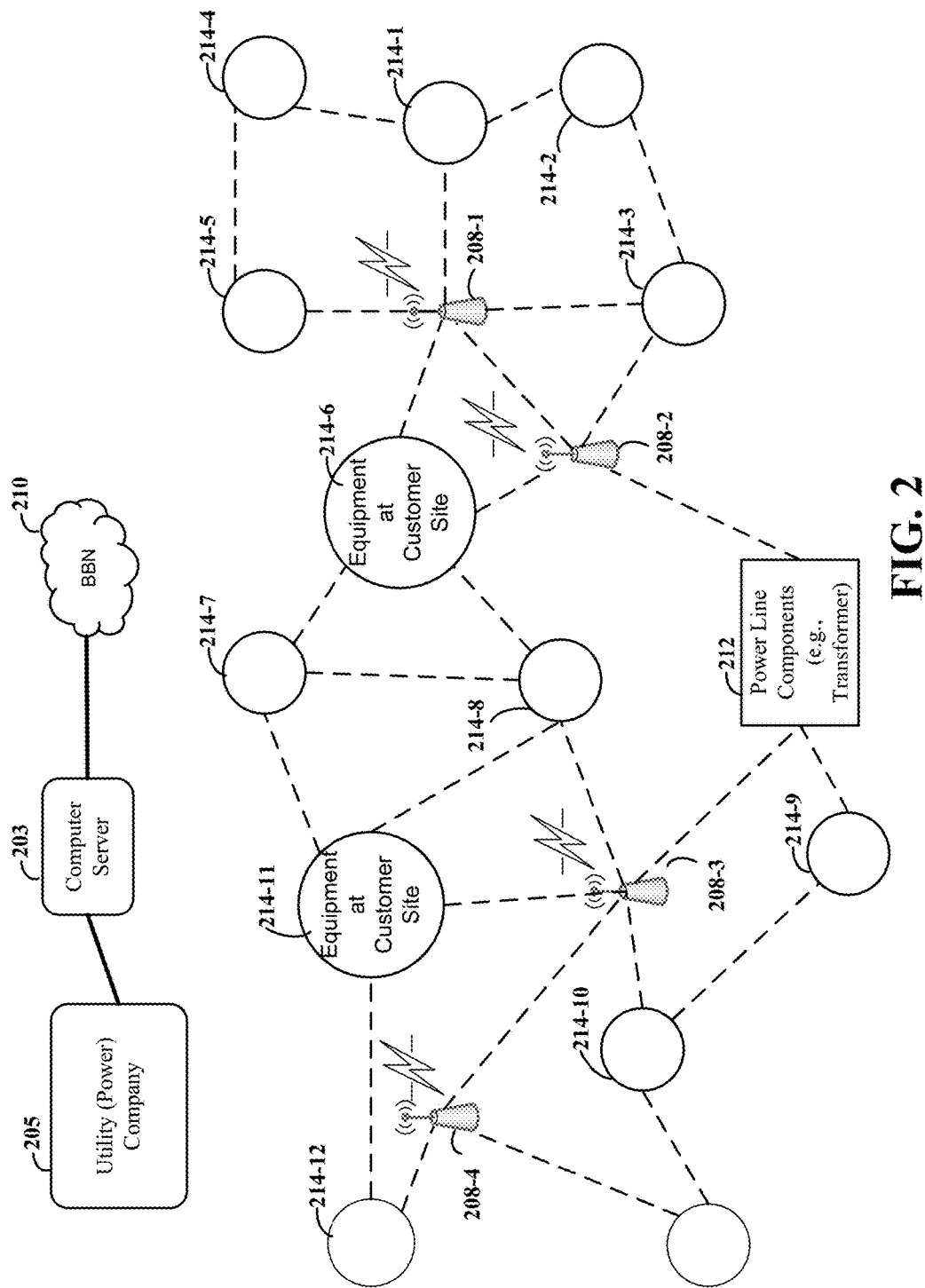
FIG. 2 is a block diagram of an example mesh network in which nodes (e.g., circuit-based endpoint devices) communicate data, consistent with embodiments of the present disclosure.

FIG. 2 is a block diagram of an example mesh network, consistent with various embodiments. In specific embodiments, the mesh network includes or forms part of a power distribution system that includes PLC in which endpoints (within 214-1, 214-2, 214-3, 214-4, 214-5, 214-6, 214-7, 214-8, 214-9, 214-10, 214-11, 214-12, herein collectively referred to as "equipment 214" for each of reference) communicate data with collector units 208-1, 208-2, 208-3, 208-4, herein referred to as "collector units 208" for ease of reference, consistent with PLC embodiments of the present disclosure. These communications occur over the same power lines which provide power from the utility power company to each of the customer sites. In this context and as mentioned previously, aspects of the present disclosure have been realized to benefit embodiments which employ PLC and those which do not.

With reference to FIG. 2, the system includes a power distribution system overlaying a broadband communications network. Illustrated aspects of the power distribution system include the utility (power) company 205 which generates the AC power for distribution via various geographically-dispersed distribution stations, for consumption at the facilities of customer sites where respective sets of equipment 214 are located. The equipment 214 operates based on the power received over the power lines (e.g., illustrated as dashed lines). In various examples, the equipment 214 at each customer site includes an endpoint device (which is or at least includes a circuit, such as a power meter and/or load switch) installed at the customer site facility. In such a power distribution-type system, the endpoint devices are typically also configured with circuitry for receiving configuration and other data from the collector units 208 (e.g., located in proximity to a grouping of nearby customer sites, which can include routers and/or the above noted "mesh network-communications controller circuitry") and for sending back reports and status information to the collector units 208, which is in turn sent back to a computer server 203 operated on behalf of the utility (power) company 205. In such PLC systems, this information is sent in both directions, between the collector units 208 and the equipment 214, over the power lines. The computer server 203 refers to and/or includes one or multiple computers (processing circuit) operating together to carry out the communications as depicted and described herein.

FIG. 2 also shows a broadband communications network ("BBN") 210 which is coupled between the computer server 203 and the equipment 214 at the customer sites. Within each of the equipment 214 of FIG. 1 is a respective communication device (e.g., a communication node) which is enabled for communications with the computer server 203 via the broadband communications network 210. In this context, the communication device is referred to as being broadband enabled. As discussed above, each of the broadband-enabled communication devices of the equipment 214 is powered via the power lines controlled by the utility power company 205.

In FIG. 2, the equipment 214 transmit symbols over communications channels to collector units 208, respectively. In certain embodiments, the equipment 214 can be located at customer locations (e.g., buildings). Transformers are often located near groups of customer sites, via substations/collector housings, to provide a step-down in voltage before the AC power is provided to the customer sites. The collector circuits (shown as collector units 208) include circuitry configured to communicate with the endpoints of the equipment 214 over the power lines, and typically also include circuitry (via high-speed network interfaces, a wide-area network, and Ethernet) for communications with a command center which is operated on behalf of the utility power company.

In certain embodiments of the present disclosure, the collector units 208 are configured to receive data (e.g., power-related data) from many different sets of equipment 214 while storing the data in a local database. The collector units 208 may be operated by the manufacturer of the communication devices (as discussed herein), and/or by a third party service provider in communication with the manufacturer. The collector units 208 can also take action based on the data received from the endpoints 214 and transmit data received from the sets of equipment 214 to the command center. The command center may be operated on behalf of the third party service provider, and may represent a separate server as compared to the server operated on behalf of the manufacturer(s). For example, in a power distribution system that includes PLC, the command center can receive data indicating conditions suggestive of a power outage from a plurality of different types of communication devices (e.g., WiFi enabled appliances as in water heaters, smart thermostats, etc.) provided by different manufacturers. The command center can retrieve data indicating that conditions exist among the equipment 214 suggestive of a power outage, as discussed herein. Also, in response to related information provided by the communication devices which are miscommunicating as described above, the command center and/or the computer server 203 can access a database which stores the device identifier for the miscommunicating communication devices, its physical (customer site) address, and as may also be useful for the protocol-specific frequency for each respective communication device, for further assessing the possible outage event.

Consistent with certain embodiments, the command center provides an interface that allows other devices to access data that has been received from equipment 214. For example, the user devices might be owned by a service provider, maintenance personnel and/or customers of the service provider. In response to identification of conditions suggestive of a power outage, the command center can provide data to user devices that are accessible by customers to provide information regarding the existence of the outage and potentially provide information estimating the duration of the outage.

The collector units 208 can communicate to the command center over a wide area network (WAN), local area network (LAN), the Internet, or other communications networks. These data networks can be implemented as a wired or wireless network. Wired networks can include any media-constrained networks including without limitation networks implemented using metallic wire conductors, fiber optic materials, or waveguides. Wireless networks include all free-space propagation networks such as networks implemented using radio wave and free-space optical networks.

Accordingly, embodiments of the present disclosure are directed toward power outage assessment using wireless or wire-enabled communication devices.

Also according to aspects of the present disclosure, the sets of customer site equipment 214-1, 214-2, etc. can include endpoint devices and broadband-enabled communication devices for use in a mesh network. The equipment at the customer sites is powered via the power lines, as illustrated using dashed lines in FIG. 2 to depict various power distribution paths available for routing power to each customer site. As previously discussed, the endpoints communicate with the collector units (not shown in FIG. 2), and the communication devices communicate with a remotely-located computer server over a broadband communications network. In example mesh networks, the endpoint devices may communicate with each other as conventional in a mesh-based communications network or via the collectors, which can include wireless routers (e.g., illustrated as the collector units 208), which are located in sufficient proximity to permit nearby devices to communicate device-to-device to reach remote regions covered by the power distribution system. The broadband-enabled communication devices, alone or in combination with the routers, are also configured to communicate over the broadband communications network, for example, by communicating with each other in a (hot-spot) communications repeater context to expand the RF coverage area (e.g., WiFi or cellular), and the broadband-enabled communication devices can also be configured to communicate directly over the broadband/RF network (e.g., Internet for the WiFi-type and/or the local cellular network). In this context, such mesh networks are complemented by the broadband-enabled communication devices to address or overcome the problems as discussed above. For each such implementation in which broadband-enabled communication devices are employed, the same types of communication schemes and protocols can be used as described herein to manage, discern and report likely outage events.

The computer server can also be communicatively coupled to the communication devices (not shown in FIG. 2) to receive data from a subset (referring to less than all) of the communication devices in the system. For example, in certain implementations, conventional operation of the mesh network is employed throughout the power distribution system and broadband-enabled communication devices are added only in regions believed to be beneficial, such as being representative of areas critical to determining an outage. Such subsets of broadband-enabled communication devices used for representing sampled regions to reflect the system as a whole.

As described herein, the server may be configured and arranged to assess power-related data, such as assessing consumption and failures including possible power outage within one or more regions corresponding to the subset of broadband-enabled communication devices, in response to receiving the respective communications from the subset of broadband-enabled communication devices. In some embodiments, in response to the assessment, recourse can be taken for discerning other nodes that might be affected by the outage and/or for isolating the cause of the outage and therefrom determining where and how to effect reparations for power recovery. For example, each of the broadband-enabled communication devices may be coupled to the power line components 212 by a variety of power distribution paths, as illustrated. Each of the communication devices may be enabled for wireless or wired communication (with one another) via the routers, with the computer server permitted to communicate with each of the communication devices as described above. Additionally, two or more nodes (e.g., endpoint device and/or other circuit-based communication devices) can perform a time synchronization protocol, as described in connection with FIG. 1.

Although the embodiment of FIG. 2 illustrates a mesh-based communications network for use in a power distribution system, embodiments are not necessarily limited in this regard. For example, various embodiments can use the above-described time synchronization protocol between communication nodes in a non-mesh communications network and/or systems other than a power distribution system. As a specific example, the above-described time synchronization protocol can be implemented as part of a utility system that is not a power distribution system. Another specific example includes implementation of the time synchronization protocol between communication nodes of a home monitoring system or other types of security systems (e.g., security system with multiple cameras and/or sensors, system with sensors on different equipment or devices). Another specific example includes implementation of the time synchronization protocol between communication nodes of a building or industrial monitoring system, which may include sensors on different equipment devices. For example, an industrial monitoring system can communicate data from sensors about the process or manufacture procedure, and which can provide feedback to a control system.

Figure 3:
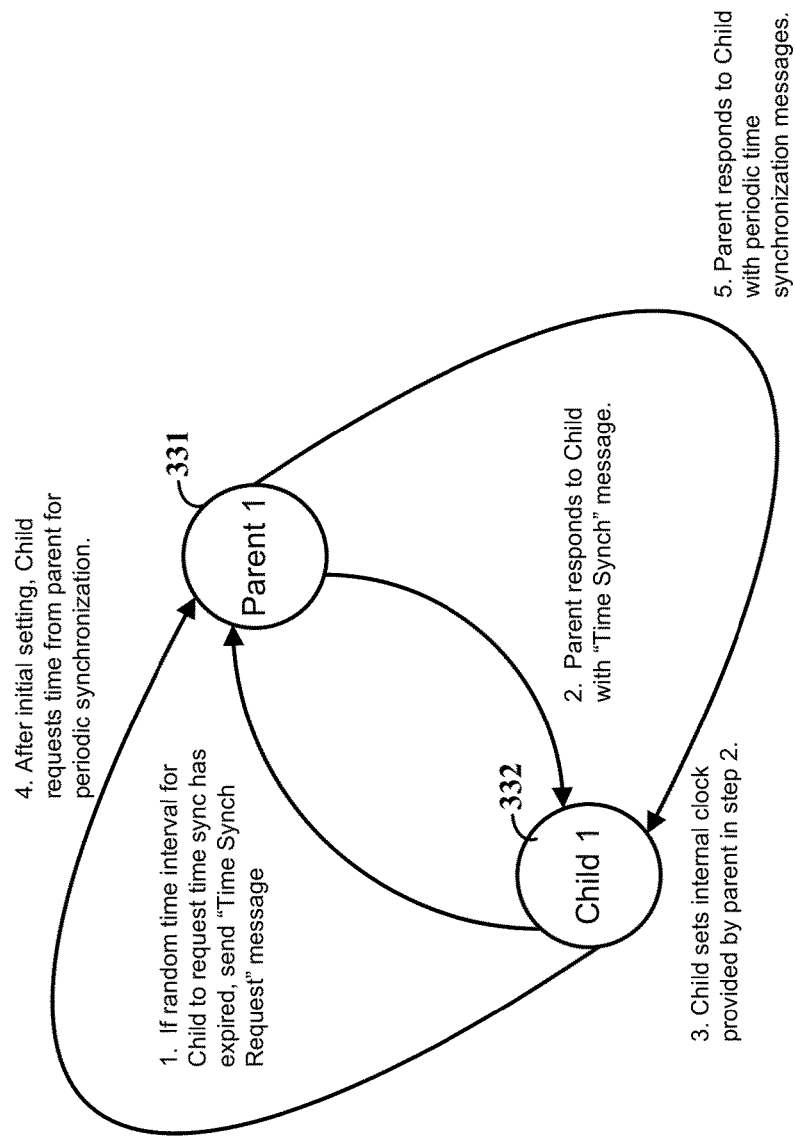
FIG. 3 depicts a flow diagram illustrating an example communication protocol for timing synchronizing between nodes, consistent with embodiments of the present disclosure.

FIG. 3 depicts a flow diagram illustrating an example communication protocol for timing synchronizing between nodes in a communications network, consistent with embodiments of the present disclosure. As previously described, the data paths for communicating data in a communications network can be provided via a communication protocol over which data between circuits in communication nodes communicate using a plurality of abstraction layers. In specific embodiments, the nodes can be configured as communication points that form an array of nodes as part of a power distribution system and can operate on power-related data indicative of power consumption within the system. In this context, each such node has a communication circuit to communicate the power-related data between communication nodes.

As illustrated, the first node 332 provides a time synchronization request to the second node 331 within a random interval after the first node joins into the communications network. The second node 331 responds by providing timing information, such as a time synch message. For example, the second node 331 provides the timing information to the first node 332 as a time value in a uniquely-recognizable data frame via one of the upper-level layers in response to receiving the time synchronization request. The first node 332 sets an internal clock to a parameter conveyed from the second node 331 in the timing information. The first node 332 and second node 331 can maintain on-going time synchronization with each other by updating the time value subsequently within predetermined time ranges.

Figure 4:
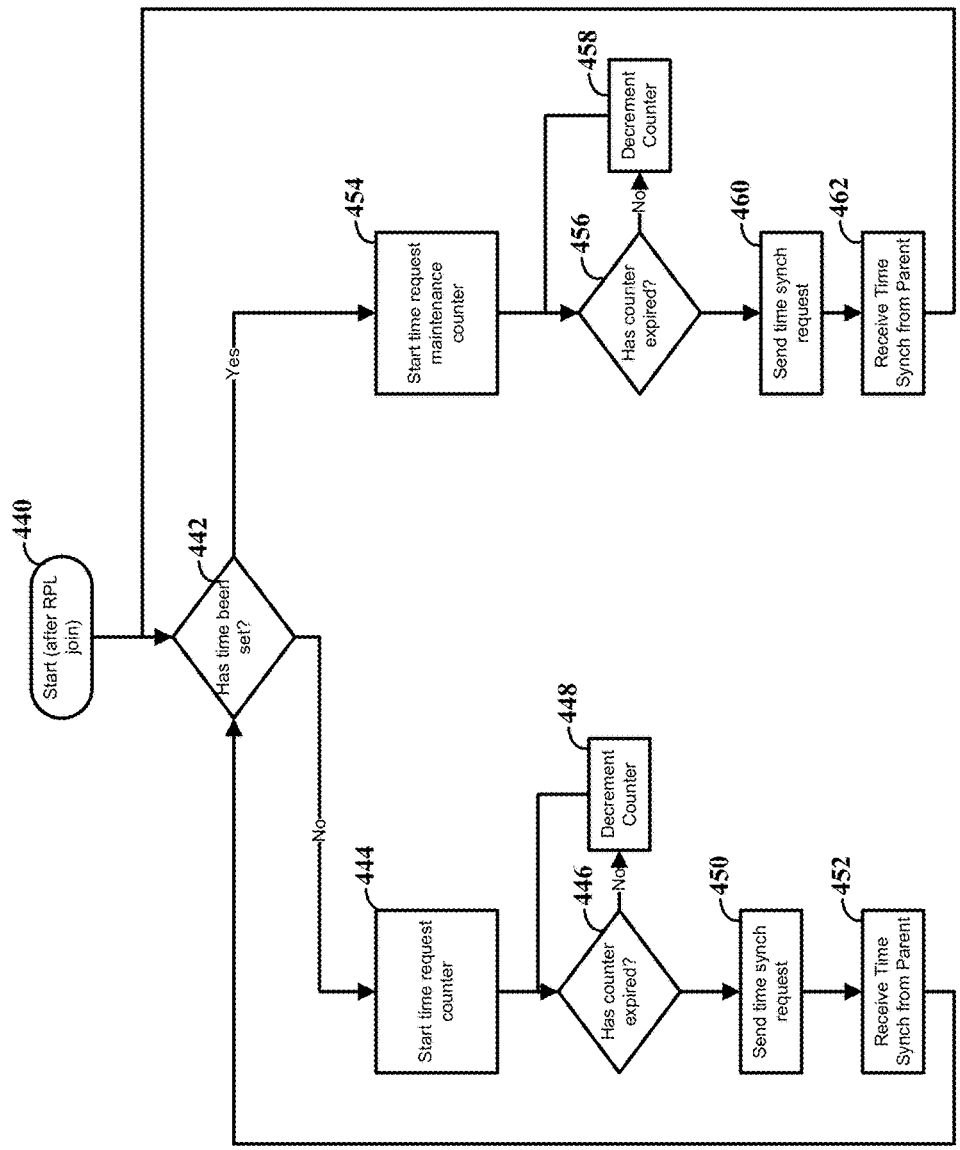
FIG. 4 depicts a flow diagram illustrating operation of time synchronization by node, consistent with the present disclosure.

FIG. 4 depicts a flow diagram illustrating operation of time synchronization by node circuitry (aka, circuit-based node or simply node), consistent with the present disclosure. As illustrated, at 440, the node (e.g., the child node) joins into the communications network. After joining, at 442, the node determines if the time has been set. The timing has been set, for example, if a parameter has been set as indicated by the clock of the node.

In response to determining the time has not been set, at 444, the node can start a time request counter (e.g., the random time selected from the first time value). At 446, the node determines if the counter has expired. If the counter has not expired, at 448, the node decrements the counter. If the counter has expired, at 450, the node sends the time synchronization request to the other node (e.g., the parent node). At 452, the node receives the timing information from the other node and can set the clock to a parameter based on the timing information.

In response to determining the time has been set, at 454, the node can start a request maintenance counter to a value of the predetermined time periods. At 456, the node determines if the maintenance counter has expired. If the counter has not expired, at 458, the node decrements the counter. If the counter has expired, at 460, the node sends the time synchronization request to the other node (e.g., the parent node). At 462, the node receives the (updated) timing information from the other node and can set the clock to a parameter from the timing information.

In various other embodiments, the random interval and/or the predetermined time periods can be set and/or adjusted. For example, the random interval can be set or otherwise selected from the first time interval. As previously described, the first time interval can include a range (or time span), such as between 0 and 120 seconds, from which the random interval is selected. The predetermined time periods can be greater than the first time value (e.g., the range) and/or the selected random interval, in some embodiments, although embodiments are not necessarily so limited. The node can set the random interval and/or predetermined time periods, in some embodiments. In other embodiments, other circuitry (e.g., the parent node or the mesh network-communications controller circuitry) can set or adjust the random interval and/or predetermined time periods.

Unless otherwise indicated, various general purpose systems and/or logic circuitry may be used with programs in accordance with the teachings herein, or it may prove convenient to construct a more specialized apparatus to perform the required method. For example, according to the present disclosure, one or more of the methods can be implemented in hardwired circuitry by programming a general-purpose processor, other fully or semi-programmable logic circuitry, and/or by a combination of such hardware and a general-purpose processor configured with software. As another example, it will be appreciated that the term "communication devices" refers to and/or includes circuits enabled to communicate other devices, for example over the illustrated broadband network, such as WiFi and/or cellular enabled devices such as IoTs and the like. For example, WiFi/cellular enabled devices may include a desktop CPU, tablet, smart phone, etc. Accordingly, the various components and processes shown in the figures can be implemented in a variety of circuit-based forms, such as through the use of data processing circuits (operative by circuit components alone or in combination with configuration/software data, otherwise known as "modules").

It is recognized that aspects of the disclosure can be practiced with computer/processor-based system configurations other than those expressly described herein. The required structure for a variety of these systems and circuits would be apparent from the intended application and the above description. The various terms and techniques are used by those knowledgeable in the art to describe aspects relating to one or more of communications, protocols, applications, implementations and mechanisms. One such technique is the description of an implementation of a technique expressed in terms of an algorithm or mathematical expression. While such techniques may be implemented, for example, by executing code on a computer, the expression of that technique may be conveyed and communicated as a formula, algorithm, or mathematical expression. For the purposes of this document, the term "communication devices" (as well as "node," "endpoint" and "endpoint device") refers to and/or includes circuits enabled to communicate, for example over the illustrated broadband network, such as WiFi and/or cellular enabled devices such as smart thermostats, smart water heaters and the like. For example, WiFi/cellular enabled device may include a desktop CPU, tablet, smart phone, etc.

In certain embodiments, machine-executable instructions are stored for execution in a manner consistent with one or more of the methods of the present disclosure. The instructions can be used to cause a general-purpose or special-purpose processor that is programmed with the instructions to perform the steps of the methods. The steps may be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions.

The various embodiments described above are provided by way of illustration and should not be construed to necessarily limit the disclosure. Based on the above discussion and illustrations, those skilled in the art will readily recognize that various modifications and changes may be made to the present disclosure without strictly following the exemplary embodiments and applications illustrated and described herein. For instance, such changes may include variations on particular circuits and/or software code to implement one or more of the various modules. Such modifications and changes do not depart from the true spirit and scope of the present disclosure, including aspects set forth in the following claims.

What is claimed is:

1. An apparatus for use in a power distribution system having power-related data that is shared between communication nodes, the apparatus comprising:
    a mesh-based communications network including a first node and a second node configured to communicate power-related data associated with power consumed in a power distribution system, each of the first and second nodes including a communication circuit configured and arranged to communicate the power-related data;
    at least one of the first and second nodes further including a clock circuit and is configured and arranged to:
        communicate in the mesh-based communications network using a plurality of abstraction layers including a lower-level layer used for node-node interaction involving identification of respective ones of a plurality of other communication nodes and including upper-level layers;
        provide a time synchronization request to the other node of the communication nodes after being permitted to join into the mesh-based communications network;
        set the clock circuit to a parameter conveyed from the other node via timing information provided in a uniquely-recognizable data frame as communicated via one of the upper-level layers; and
        maintain on-going time synchronization by communicating additional time synchronization requests within predetermined time ranges.

2. The apparatus of claim 1, wherein the data frame is identifiable by data having a unique identifier and the node is configured and arranged to provide the time synchronization request to the other node via the one upper-level layer, and communicate data with the other node while being time synchronized with each other in the mesh-based communications network.

3. The apparatus of claim 1, wherein the node is configured and arranged to provide the time synchronization request via the one upper-level layer, receive the timing information via the one upper-level layer, and set the clock circuit to the parameter without pushing the timing information through one or more other layers of an Internet Protocol (IP) stack.

4. The apparatus of claim 1, wherein the at least one of the first and second nodes is further configured and arranged to provide the time synchronization request to the other node of the communication nodes within an arbitrarily-set or random interval after being permitted to join into the mesh-based communications network, the arbitrarily-set or random interval being randomized for each request as a time within a first time span, and wherein the first time span is provided after forming a link with the other node.

5. The apparatus of claim 1, wherein the at least one of the first and second nodes is further configured and arranged to provide the time synchronization request to the other node of the communication nodes within an interval after being permitted to join into the mesh-based communications network, wherein the interval is not randomized for each request as a time within a first time span, and the first time span is provided after forming a link with the other node.

6. The apparatus of claim 1, wherein the one of the upper-level layers is or includes a data-link layer.

7. The apparatus of claim 1, further including mesh network-communications controller configured and arranged with the node and other node to provide data paths for communicating data, including the power-related data, in the mesh-based communications network via a beacon-based communication protocol over which data between the first and second nodes is communicated using the plurality of abstraction layers.

8. An apparatus for use in a power distribution system having power-related data shared between nodes in a communications network, the apparatus comprising:
a first node and a second node, each including a clock circuit and each being configured and arranged to:
communicate in a mesh-based communications network using a plurality of abstraction layers including a lower-level layer used for node-node interaction involving identification of respective ones of a plurality of other communication nodes and including upper-level layers;
provide a time synchronization request to another node of the communication nodes within an arbitrarily-set or random interval after being permitted to join into the mesh-based communications network;
set the clock circuit to a parameter conveyed from the other node via timing information provided in a uniquely-recognizable data frame as communicated via one of the upper-level layers; and
maintain on-going time synchronization by communicating additional time synchronization requests within predetermined time ranges.

9. The apparatus of claim 8, wherein each node is configured and arranged to operate on power-related data indicative of power consumption within the power distribution system, and further includes a communication circuit configured and arranged to communicate the power-related data between the communication nodes.

10. The apparatus of claim 8, wherein each of the first and second nodes is configured and arranged to communicate the timing information for setting the parameter, via a time value in the uniquely-recognizable data frame, via the one of the upper-level layers in response to receiving the time synchronization request.

11. The apparatus of claim 8, further including mesh network-communications controller circuitry and the other node, wherein the mesh network-communications controller circuitry, the first node and second node are configured and arranged to provide data paths for communicating data in the mesh-based communications network via a beacon-based communication protocol over which data between circuits in communication nodes, including the node and the second node, communicate using the plurality of abstraction layers.

12. A method for communicating data between communication nodes in a power distribution system, the method comprising:
providing data paths for communicating data in a mesh-based communications network via a communication protocol over which data between circuits in communication nodes, including a first node and second node, communicate using a plurality of abstraction layers including a lower-level layer used for node-node interaction involving identification of respective ones of the communication nodes and including upper-level layers;
providing, by the first node, a time synchronization request, within an arbitrarily-set or random interval after the first node is permitted to join into the mesh-based communications network;
providing timing information to the first node as a time value in a uniquely-recognizable data frame via one of the upper-level layers in response to receiving the time synchronization request;
setting a clock circuit of the first node to a parameter conveyed from the second node in the timing information; and
maintaining, by the first node and second node, on-going time synchronization with each other by updating the time value subsequently within predetermined time ranges.

13. The method of claim 12, further including communicating, by the first node and second node, power-related data while being time synchronized with each other in the mesh-based communications network, the power-related data being indicative of power consumption in the power distribution system.

14. The method of claim 12, wherein the arbitrarily-set or random interval is randomized for each request as a time within a first time span, and the first time span is provided after forming a link with the second node.

15. The method of claim 12, further including setting the arbitrarily-set or random interval.

16. The method of claim 12, further including adjusting the arbitrarily-set or random interval.

17. An apparatus comprising:
mesh network-communications controller circuitry, a first node and second node configured and arranged to provide data paths for communicating data in a mesh-based communications network via a beacon-based communication protocol over which data between circuits in communication nodes, including the first node and the second node, communicate using a plurality of abstraction layers including a lower-level layer used for node-node interaction involving identification of respective ones of the communication nodes and including upper-level layers;
the first node including a clock circuit and being configured and arranged to send a time synchronization request, within an arbitrarily-set or random interval after the first node is permitted by the mesh network-communications controller circuitry to join into the mesh-based communications network and to set the clock circuit to a parameter conveyed from the second node;
the second node being configured and arranged to provide timing information used by the first node for setting the parameter, via a time value in a uniquely-recognizable data frame, to the first node via one of the upper-level layers in response to receiving the time synchronization request; and
the first node and second node being configured and arranged to communicate data while being time synchronized with each other in the mesh-based communications network and to maintain on-going time synchronization with each other by updating the time value subsequently within predetermined time ranges.

18. The apparatus of claim 17, wherein the first node and second node are communication nodes within a power distribution system and are further configured and arranged to operate on power-related data indicative of power consumption within the power distribution system.

19. The apparatus of claim 18, wherein each of the first node and second node further includes a communication circuit configured and arranged to communicate the power-related data between communication nodes of the power distribution system.

20. The apparatus of claim 17, wherein the first node and second node are configured and arranged to communicate the time value and set the parameter for time synchronization as part of a time synchronization protocol, and wherein the first node is further configured and arranged to receive timing information, from another other communication node, for providing time synchronization with the other communication node, via the time synchronization protocol.

21. The apparatus of claim 17, wherein the timing information includes a unique identifier and a time value, wherein the time value includes information selected from the group consisting of a date, a time, and a combination thereof.

22. The apparatus of claim 17, wherein the first node is configured and arranged to set the clock circuit to the parameter conveyed from the second node without pushing the time value via one or more other layers of an Internet Protocol (IP) stack.

23. The apparatus of claim 17, wherein the arbitrarily-set or random interval is randomized for each request as a time within a first time span, and the first time span is provided after forming a link with the second node.

24. The apparatus of claim 17, wherein the one-of the upper-level layers is or includes a data-link layer, and wherein the first node is configured and arranged to link to the second node by providing a beacon request to the second node and receiving a beacon response from the second node via the data-link layer.

* * * * *